US012297972B2

(12) United States Patent
Schaefer et al.

(10) Patent No.: US 12,297,972 B2
(45) Date of Patent: May 13, 2025

(54) ARRANGEMENT FOR A VEHICLE LAMP

(71) Applicant: Hella GmbH & Co. KGaA, Lippstadt (DE)

(72) Inventors: Heinrich Schaefer, Bad Wuennenberg (DE); Christoph Seeberg-Elverfeldt, Wadersloh (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/178,517

(22) Filed: Mar. 5, 2023

(65) Prior Publication Data

US 2023/0204176 A1 Jun. 29, 2023

Related U.S. Application Data

(63) Continuation of application No. PCT/EP2021/073401, filed on Aug. 24, 2021.

(30) Foreign Application Priority Data

Sep. 1, 2020 (DE) ..................... 10 2020 122 825.2

(51) Int. Cl.
*F21S 41/29* (2018.01)
*F21S 41/141* (2018.01)
*F21V 19/00* (2006.01)

(52) U.S. Cl.
CPC ............ *F21S 41/29* (2018.01); *F21S 41/141* (2018.01); *F21V 19/0035* (2013.01); *F21V 19/004* (2013.01)

(58) Field of Classification Search
CPC .. F21V 19/004; F21V 19/0035; F21V 17/164; F21V 21/025; F21V 19/003;
(Continued)

(56) References Cited

U.S. PATENT DOCUMENTS

2005/0231658 A1* 10/2005 Chieh ................. H05K 5/0013 349/56
2007/0183156 A1 8/2007 Shan
(Continued)

FOREIGN PATENT DOCUMENTS

DE 102007002838 A1 3/2008
DE 202010008114 U1 11/2010
(Continued)

OTHER PUBLICATIONS

Search English translation of KR 101680568 B1 (Year: 2016).*

*Primary Examiner* — Omar Rojas Cadima
(74) *Attorney, Agent, or Firm* — Husch Blackwell LLP

(57) ABSTRACT

An arrangement is provided for a vehicle lamp having a flexible printed circuit board, a means of reinforcement of one area of the flexible printed circuit board that is connected to the flexible printed circuit board, an LED that is arranged in this area on the printed circuit board, and a means of shaping light that can be emitted by the LED. The means of shaping light includes at least one light-shaping optical means, and the means of reinforcement is connected to the means of shaping light. The means of reinforcement includes at least one protruding element that comes into contact under tension with a connecting element of the means of shaping light or with a connecting element connected to such means and/or engages an indentation of the connecting element.

12 Claims, 3 Drawing Sheets

(58) Field of Classification Search
CPC .... F21V 19/0045; F21V 17/108; F21V 17/14; F21V 17/16; F21V 17/18; F21V 17/20; F21Y 2107/70; F21Y 2115/10; F21Y 2103/10; F21S 41/198; F21S 41/29; F21S 41/141; F21S 43/14; F21S 4/28; H05K 2201/10106
See application file for complete search history.

(56) References Cited

U.S. PATENT DOCUMENTS

| | | | | |
|---|---|---|---|---|
| 2009/0290334 | A1 | 11/2009 | Ivey et al. | |
| 2011/0192586 | A1 | 8/2011 | Fan | |
| 2011/0305024 | A1 | 12/2011 | Chang | |
| 2013/0002982 | A1* | 1/2013 | Momose .............. | G02B 6/0046 362/613 |
| 2014/0063805 | A1* | 3/2014 | Song ..................... | F21S 43/195 362/382 |
| 2015/0103539 | A1 | 4/2015 | Lee | |

FOREIGN PATENT DOCUMENTS

| | | | |
|---|---|---|---|
| DE | 102009023055 | A1 | 12/2010 |
| DE | 102010062331 | A1 | 6/2012 |
| DE | 202012102963 | U1 | 1/2014 |
| DE | 102015220794 | A1 | 4/2017 |
| EP | 1328140 | A2 | 7/2003 |
| EP | 1684003 | B1 | 9/2008 |
| EP | 2096685 | A1 | 9/2009 |
| EP | 2886945 | A1 | 6/2015 |
| KR | 101680568 | B1 * | 11/2016 |
| WO | 2011042195 | A1 | 4/2011 |

* cited by examiner

ARRANGEMENT FOR A VEHICLE LAMP

CROSS REFERENCE

This application claims priority to PCT Application No. PCT/EP2021/073401, filed Mar. 10, 2022, which itself claims priority to German Application No. 10 2020 122825.2, filed Sep. 1, 2020, the entireties of both of which are hereby incorporated by reference.

FIELD OF THE INVENTION

The invention relates to an arrangement for a vehicle lamp, specifically a vehicle headlamp, with a flexible printed circuit board, with a means of reinforcement of one area of the flexible printed circuit board that is connected to the flexible printed circuit board, with an LED that is arranged in this area on the printed circuit board, and a means of shaping light that can be emitted by the LED, where this means of shaping light features at least one light-shaping optical means, where the means of reinforcement is connected to the means of shaping light,

BACKGROUND OF THE INVENTION

Such an arrangement is known from document EP 1 684 003 B1. With this arrangement known from document EP 1 684 003 B1, the means of reinforcement, designated there as a heat dissipating element, provides for an aperture for holding and retaining of a first fixing pin with which the means of shaping light, designated there as a three-dimensional optical component, is equipped. In the aperture, protruding elements, designated there as retaining tabs, are provided for that are deformed by the insertion of the first fixing pin and that hold the first fixing pin following deformation.

The first fixing pins serve not only to fasten but also to position the means of shaping light, on the one hand, and the means of reinforcement or the flexible printed circuit board, on the other.

A further solution is disclosed in the document WO 2011/042195 A1. The means of shaping light designated there as a optic features a mandrel on a side facing the printed circuit board that is inserted through the flexible printed circuit board into an aperture in the means of reinforcement that is arranged on the back of the printed circuit board and is designated as a holding body in that document. A locking tab of the means of reinforcement extends into the aperture and clamps the mandrel inserted into the aperture.

With the arrangement from document WO 2011/042195 A1, special care must be taken particularly during assembly work as the slightest negligence can lead to the mandrels being damaged when they are inserted into the apertures. It is then not always possible to use them for positioning and connecting.

BRIEF SUMMARY OF THE INVENTION

This was also a reason to search for an alternative solution for the connection between the means of shaping light and the means of reinforcement.

An alternative solution was found in that the means of reinforcement features at least one protruding element that comes into contact under tension with a connecting element of the means of shaping light or with a connecting element connected to such means and/or engages an indentation of the connecting element.

The inventive solution creates an interlocking and/or friction connection. Whereas the means of shaping light can be manufactured from only a certain group of materials due to the desired optical properties and thus the current state of technology also dictates the material for the protruding element, to the extent that the means of shaping light is monolithic, with the inventive solution the protruding element is part of the means of reinforcement. This does not have to fulfill any optical requirements. The material can therefore be chosen, for example, with regard to the mechanical requirements. This means that it is possible, for example, to manufacture the means of reinforcement from a material that is not only able to fulfill the reinforcing properties but also feature a protruding element that features the mechanical properties required for permanent mounting and easy assembly.

It is possible for the protruding element to be elastic or to have an elastic connection with the other means of reinforcement. It is in particular possible for the protruding element or its connection to be more elastic than the other means of reinforcement and less elastic than the flexible printed circuit board. It is, however, also possible for the means of reinforcement or at least the protruding element to be at least partially plastically shaped.

The reinforcing element can, for example, be manufactured from sheet metal. This can be, for example, an aluminum sheet. A sheet made of a copper alloy, a stainless steel sheet or a spring steel sheet can also be used.

The at least one protruding element can be aligned to a direction opposite to a movement for disconnecting the connection between the reinforcing means and the connecting element. This makes it possible to simplify or achieve clamping or latching between the at least one protruding element and the connecting element.

The at least one protruding element can be a curve that can be manufactured in particular by pressing.

The connecting element can feature at least one indentation into which the protruding element engages. It is possible for the connecting element to feature several adjacent indentations. These can be grooves between which ribs are formed. The protruding element can engage between these.

The at least one indentation, several of the indentations or all indentations of the connecting element can feature an undercut aperture and the at least one protruding element can engage in the undercut.

The connecting element can feature panels opposite each other between which a holder is formed which accommodates at least part of the reinforcing means.

The reinforcing means can be clamped in between the panels.

The protruding elements of the reinforcing means can engage in the indentations of the connecting element, where the indentations are provided for on the opposite panels.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
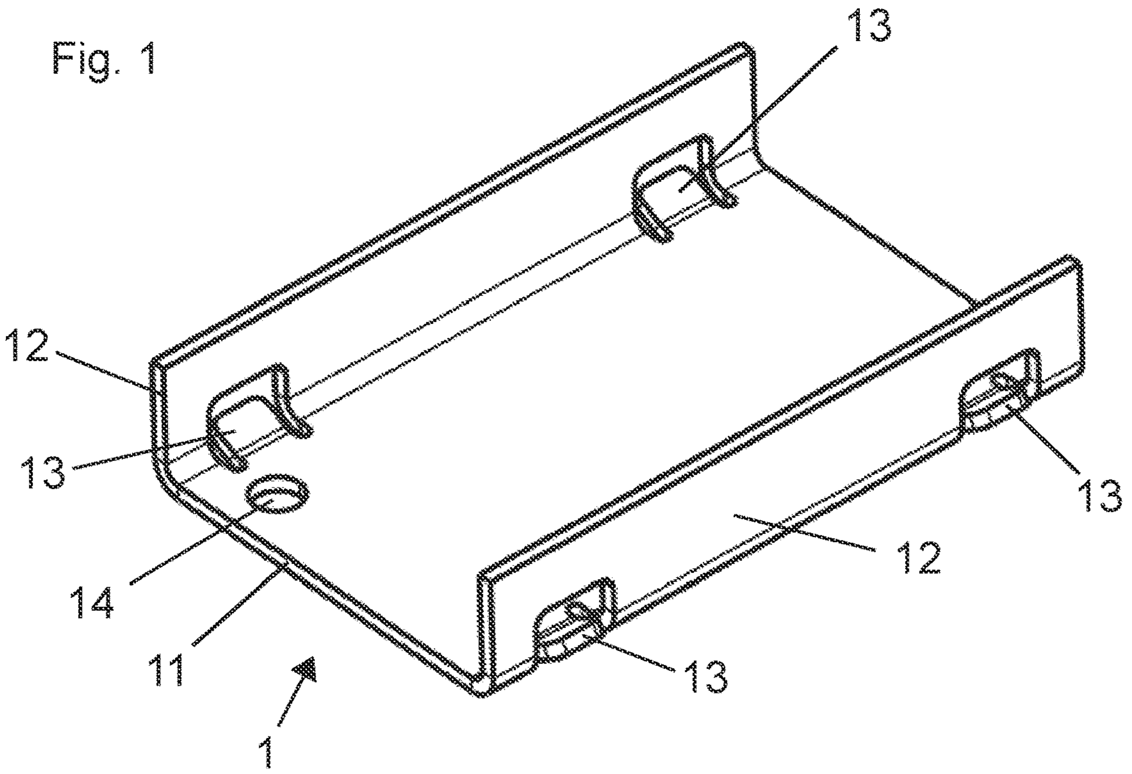
FIG. 1 is a perspective view of a reinforcing means from below.
Figure 2:
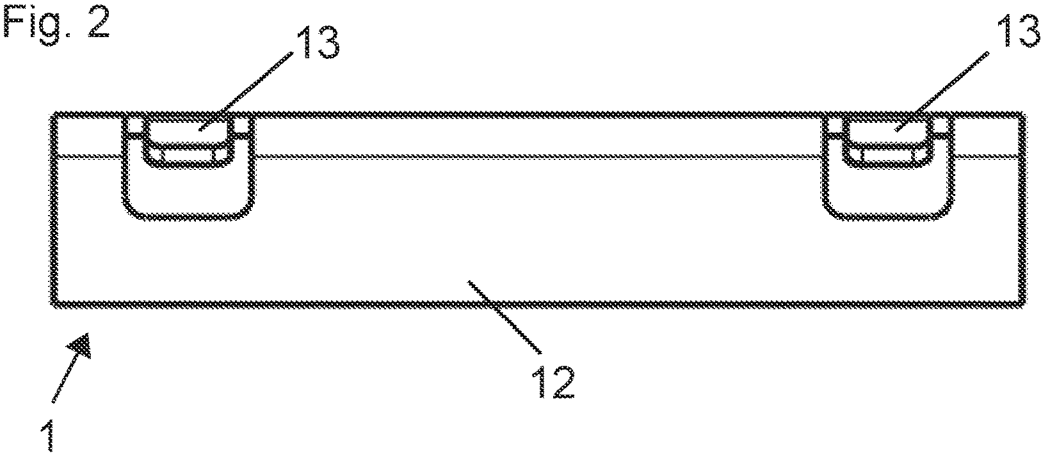
FIG. 2 is aside view of the reinforcing means.
Figure 3:
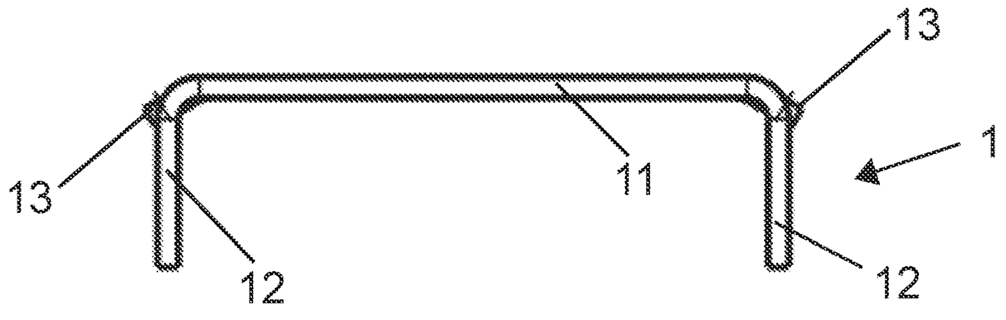
FIG. 3 is a view of a reinforcing means from the front.
Figure 4:
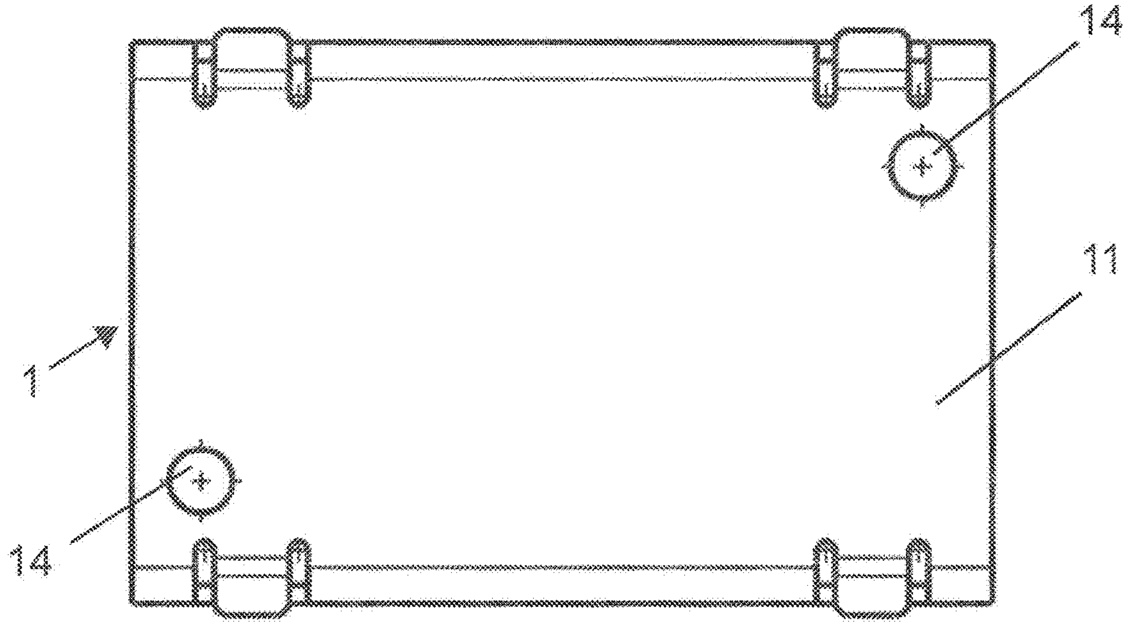
FIG. 4 is a view of a reinforcing means from above.

The reinforcing means 1 shown in FIGS. 1 through 7 is a piece of sheet metal bent to be U-shaped with two legs 11 and a bar connecting the legs 12. Holes 14 are provided for in the bar 11 at corners diagonally opposite each other, into which holes structures intended for positioning the printed circuit board towards the reinforcing means or other components, for example mandrels, can be inserted.

At four places in a transitional area between the bar 11 and the legs 12, tongues 13 in pairs opposite each other are shown as protruding elements. The ends of these tongues 13 extend laterally beyond the legs 12. The tongues 12 can be manufactured by means of punching and bending. The protruding elements 12 can be elastically deformed when little force is applied.

Figure 5:
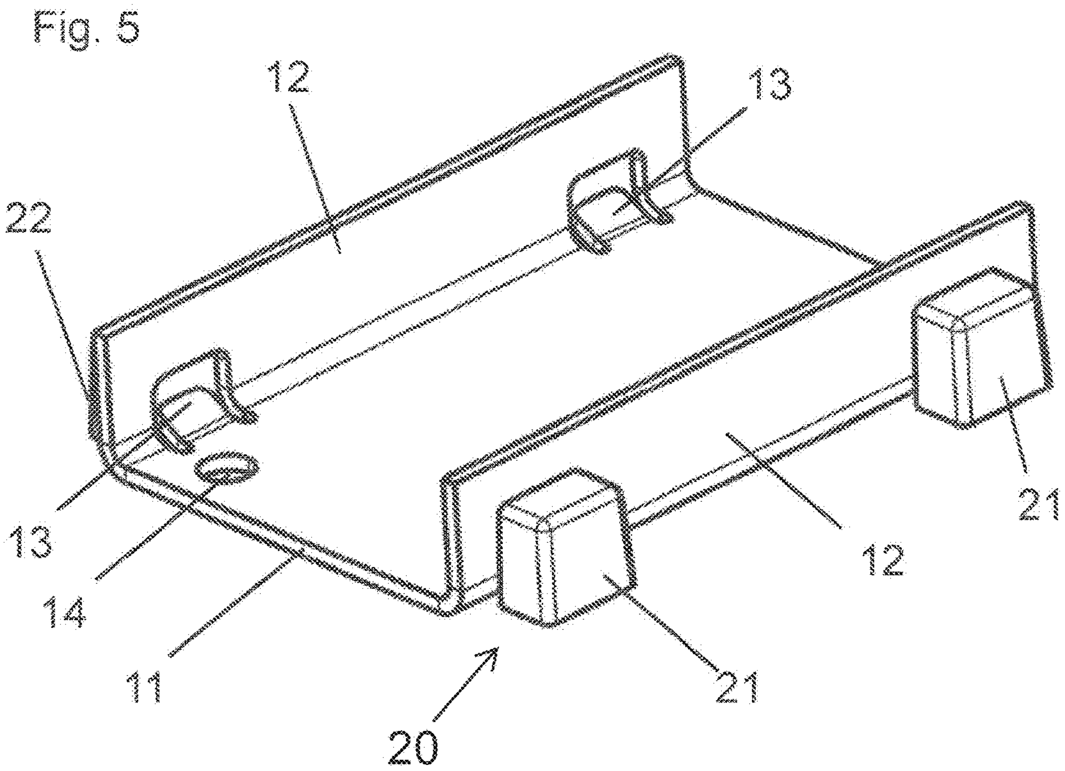
FIG. 5 is a perspective view of an arrangement of the reinforcing means and connecting elements of a means of shaping light.
Figure 6:
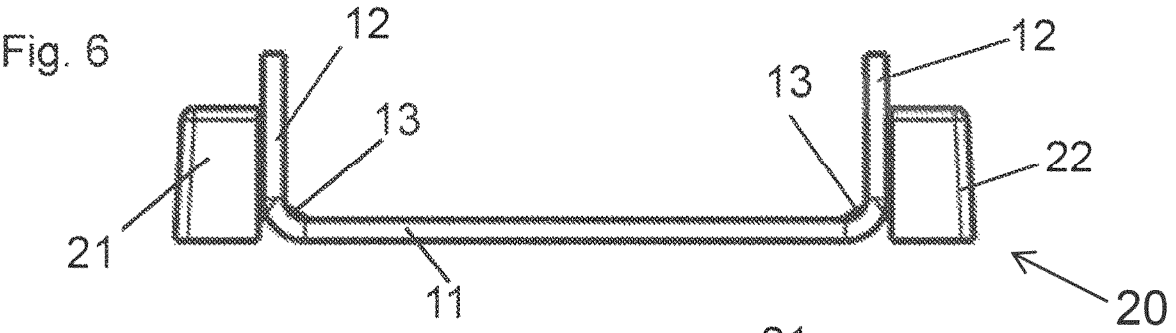
FIG. 6 is a view of the arrangement from the front.
Figure 7:
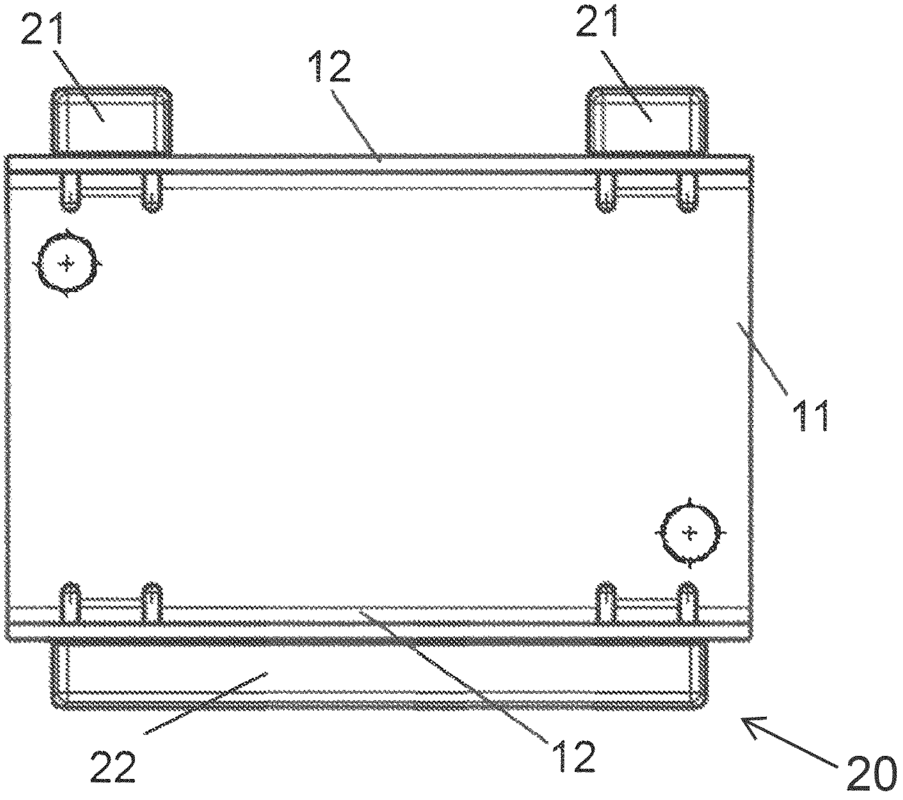
FIG. 7 is a view of the arrangement from the side.

The means of shaping light 20 features three connecting elements 21, 22 that are shown in FIGS. 5 through 7. These are permanently connected to further areas of the means of shaping light 20. These further areas are not shown in the Figures. The means of shaping light 20 may include at least one light-shaping optical means (e.g., positioned within one or more of the connecting elements 21, 22). Two connecting elements 21 of the three connecting elements 21, 22 are located at one side of the means 1 of reinforcement. The third connecting element 22 is located on the opposite side. The connecting elements 21 on the one hand and the connecting element 22 on the other hand panels facing each other that form a holder of the means of shaping light 20 into which the means 1 of reinforcement and a flexible printed circuit board fastened in particular to its bar 11 can be arranged. The distance between the panels of the connecting elements 21, 22 is larger than the outer distance of the legs 11 of the means 1 of reinforcement and smaller than the distance between the outer ends of the protruding elements 13.

The means of reinforcement 1 can, as shown in FIGS. 5 through 7, be arranged in the holder between the connecting elements 21, 22. In this context, the protruding elements 13 are elastically bent with little force such that they come into contact with the panels of the connecting elements 21, 22 by means of a friction connection, bringing about a connection between the flexible printed circuit board and the means of reinforcement 1 on the one hand and the means of shaping light 20 on the other hand.

Figure 8:
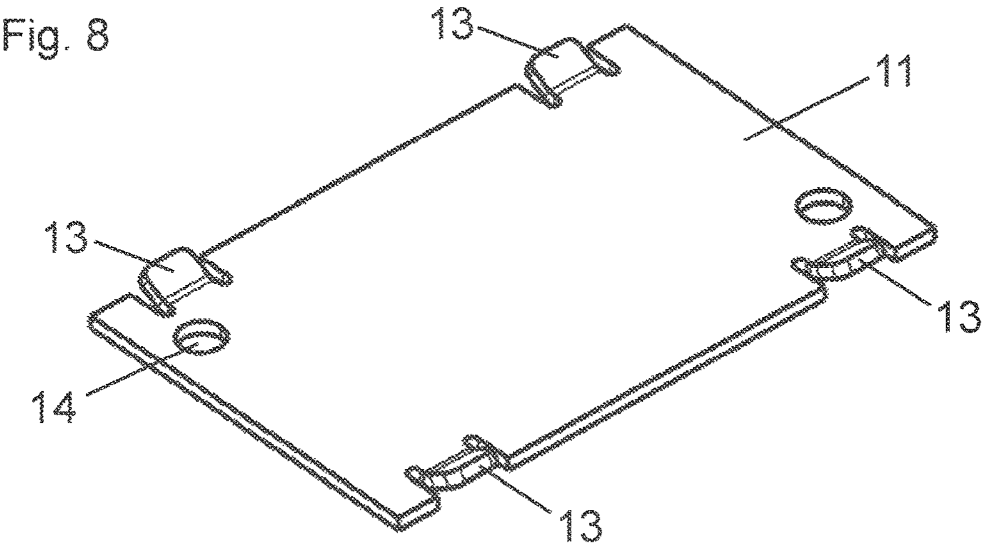
FIG. 8 is a variant of the reinforcing means.

The variant of the means of reinforcement 1 shown in FIG. 8 differs from the means 1 shown in FIGS. 1 through 7 in that it is not U-shaped and consequently does not feature any legs 12. The variant does however feature the tongues 13 or the protruding elements 13 intended for the connection between the means of shaping light and the means of reinforcement which project laterally beyond the bar 11. With these protruding elements 13, it is possible for the variant to be connected to a means of shaping light just as with the means of reinforcement 1 shown in FIGS. 1 through 7.

LIST OF REFERENCE NUMBERS

1 Means of reinforcement
11 Bar
12 Leg
13 Tongues/protruding elements
14 Holes
21 Connection element
22 Connection element

What is claimed is:

1. An arrangement for a vehicle lamp, the arrangement comprising:

a flexible printed circuit board;

a means of reinforcement having a bar, the bar connected to the flexible printed circuit board, and the bar including a first side and a second side;

a first slot in the means of reinforcement, the first slot forming a first protruding element extending outwardly from the first side of the bar;

a second slot in the means of reinforcement, the second slot forming a second protruding element extending outwardly from the second side of the bar;

a means of shaping light emitted by the flexible printed circuit board, said means of shaping light including at least one connecting element formed integrally with the means of shaping light and at least one light-shaping optical means;

wherein the means of reinforcement is connected to the means of shaping light; and wherein at least one of the first protruding element and the second protruding element comes into contact under tension with the connecting element or engages an indentation of the connecting element.

2. The arrangement in accordance with claim 1, wherein the at least one of the first protruding element and the second protruding element is elastic or has an elastic connection with the means of reinforcement.

3. The arrangement in accordance with claim 1, wherein the at least one of the first protruding element and the second protruding element is aligned to a direction opposite to a movement for disconnecting a connection between the means of reinforcement and the connecting element.

4. The arrangement in accordance with claim 1, wherein at least one of the first protruding element and the second protruding element is a stamping.

5. The arrangement in accordance with claim 1, wherein the connecting element features at least one indentation.

6. The arrangement in accordance with claim 5, wherein the at least one indentation of the connecting element features an undercut aperture, and wherein the at least one of the first protruding element and the second protruding element engages with the undercut aperture.

7. The arrangement in accordance with claim 1, wherein the connecting element includes several neighboring indentations.

8. The arrangement in accordance with claim 1, wherein the connecting element features panels opposite each other, between which a holder is formed which accommodates at least part of the means of reinforcement.

9. The arrangement in accordance with claim 8, wherein the means of reinforcement is clamped between the panels.

10. The arrangement in accordance with claim 8, wherein the at least one of the first protruding element and the second protruding element engages indentations of the at least one connecting element, and wherein the indentations are provided for on the opposite panels.

11. An arrangement for a vehicle lamp, the arrangement comprising:

a flexible printed circuit board;

a means of reinforcement coupled to the flexible printed circuit board, the means of reinforcement including:

a first leg and a second leg both extending in a first direction;

a bar extending between the first leg and the second leg;

a tongue protruding from the means of reinforcement proximate to an intersection between the bar and at least one of the first leg or the second leg, the tongue extending away from the bar at least partially in the first direction as the tongue protrudes from the means of reinforcement;

a means of shaping light emitted by the flexible printed circuit board, said means of shaping light including at least one connecting element and at least one light-shaping optical means formed integrally with the at least one connecting element;

wherein the means of reinforcement is connected to the means of shaping light; and wherein the tongue comes into contact under tension with the connecting element or engages an indentation of the connecting element.

12. An arrangement for a vehicle lamp, the arrangement comprising:

a flexible printed circuit board, a means of reinforcement coupled to the flexible printed circuit board, the means of reinforcement including:

a first leg and a second leg both extending in a first direction;

a bar extending between the first leg and the second leg;

a slot extending into the means of reinforcement, the slot positioned and located proximate to a transition between the bar and at least one of the first leg or the second leg such that the slot is at least partially formed in the bar, the slot forming at least one protruding element;

a means of shaping light emitted by the flexible printed circuit board, said means of shaping light including at least one connecting element and at least one light-shaping optical means formed integrally with the at least one connecting element;

wherein the means of reinforcement is connected to the means of shaping light; and wherein the at least one protruding element comes into contact under tension with the connecting element or engages an indentation of the connecting element.

* * * * *